Oct. 6, 1936.  S. CHRISTOPLOS  2,056,711
REFRIGERATED BUTTER CUTTING MACHINE
Filed Oct. 4, 1935   6 Sheets-Sheet 1
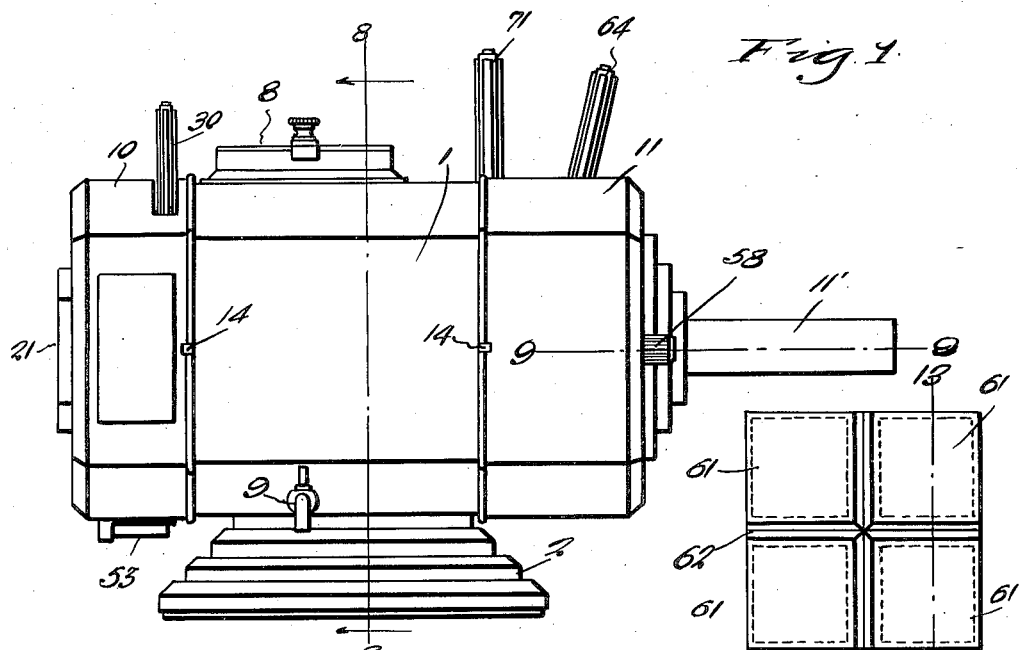
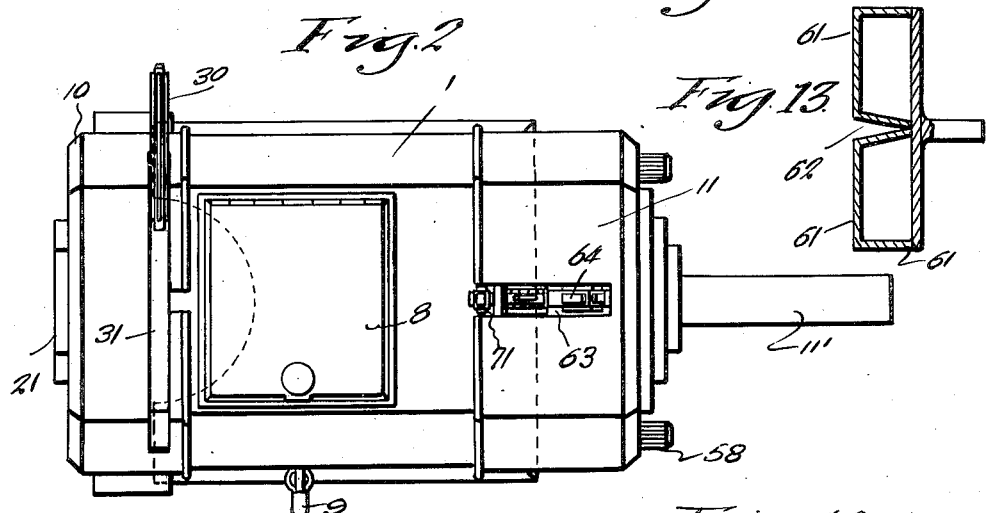
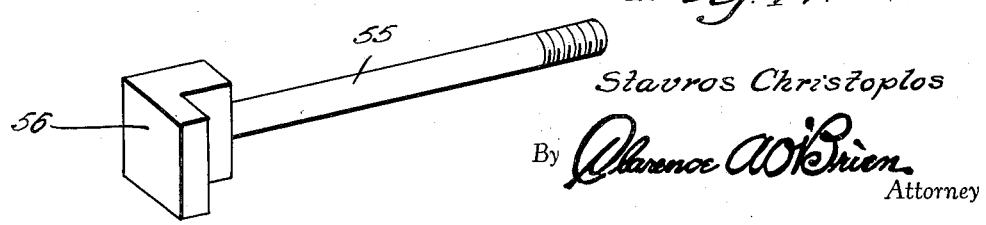
Inventor
Stavros Christoplos
By Clarence A. O'Brien
Attorney

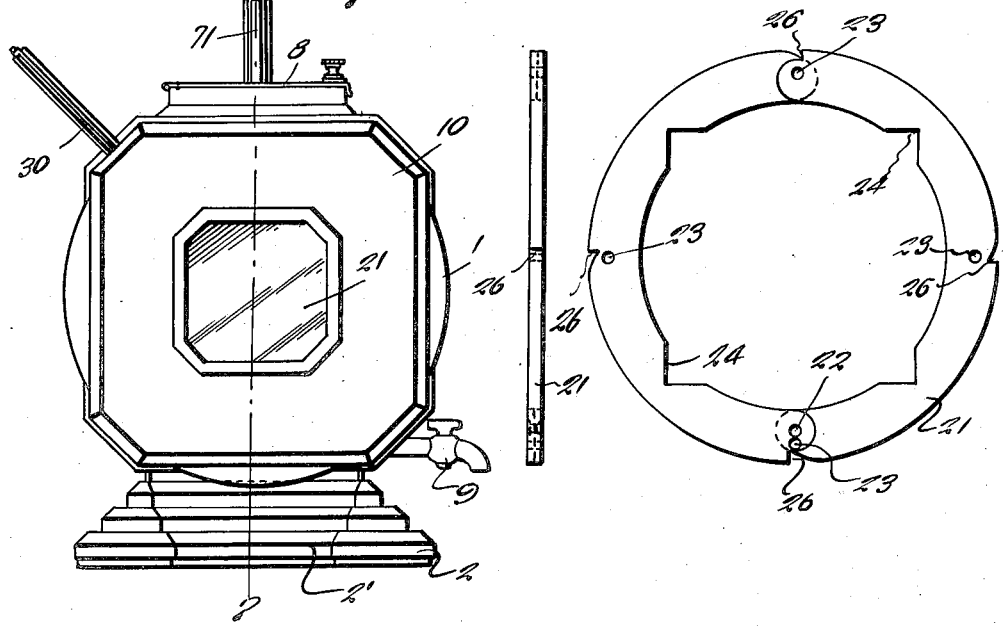
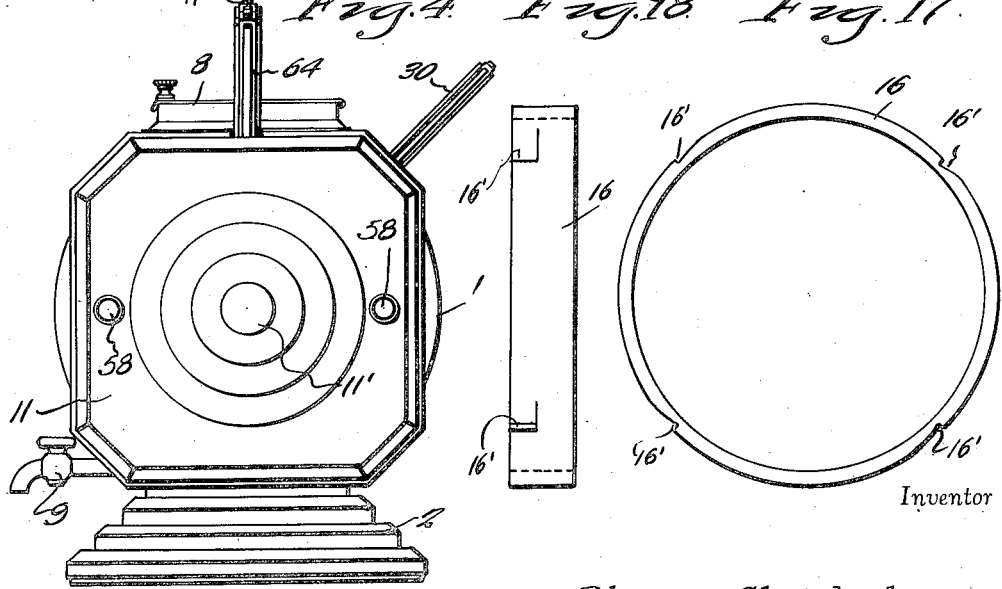

Oct. 6, 1936.　　　S. CHRISTOPLOS　　　2,056,711
REFRIGERATED BUTTER CUTTING MACHINE
Filed Oct. 4, 1935　　　6 Sheets-Sheet 3
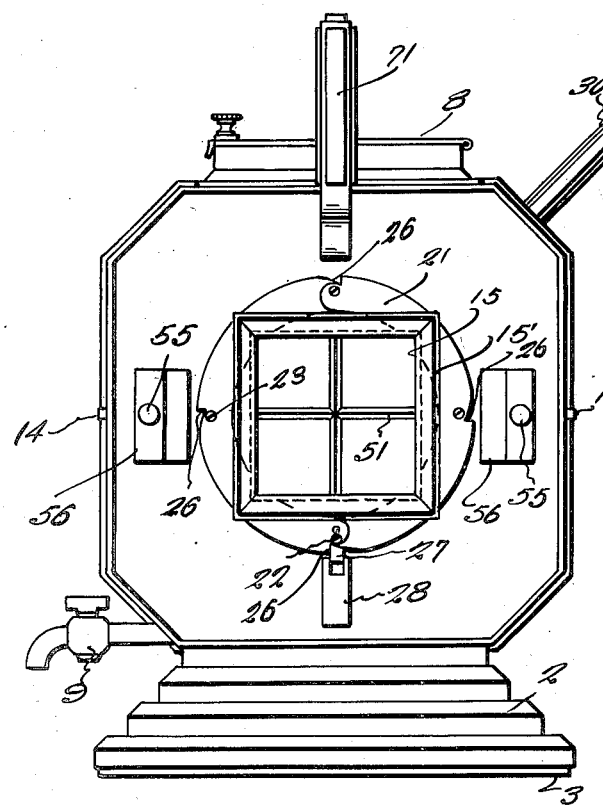
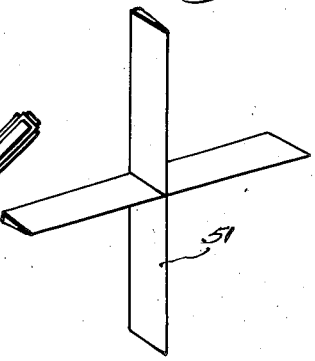
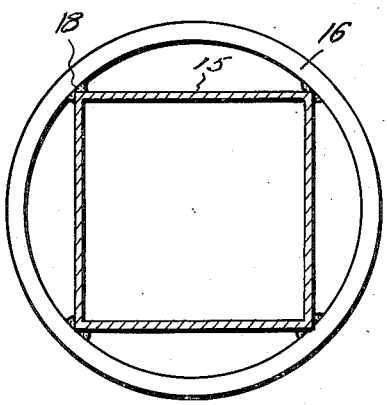
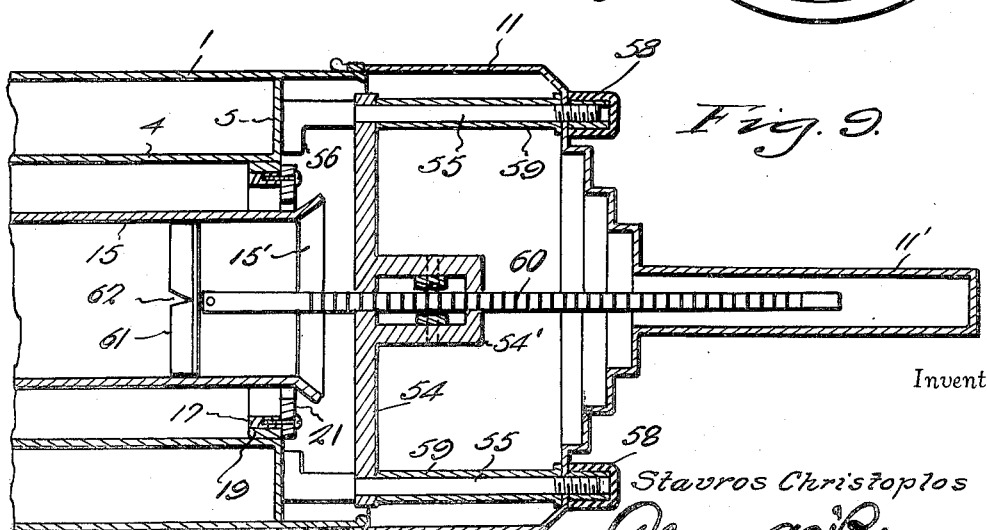
Inventor
Stavros Christoplos
By *Clarence A. O'Brien*
Attorney

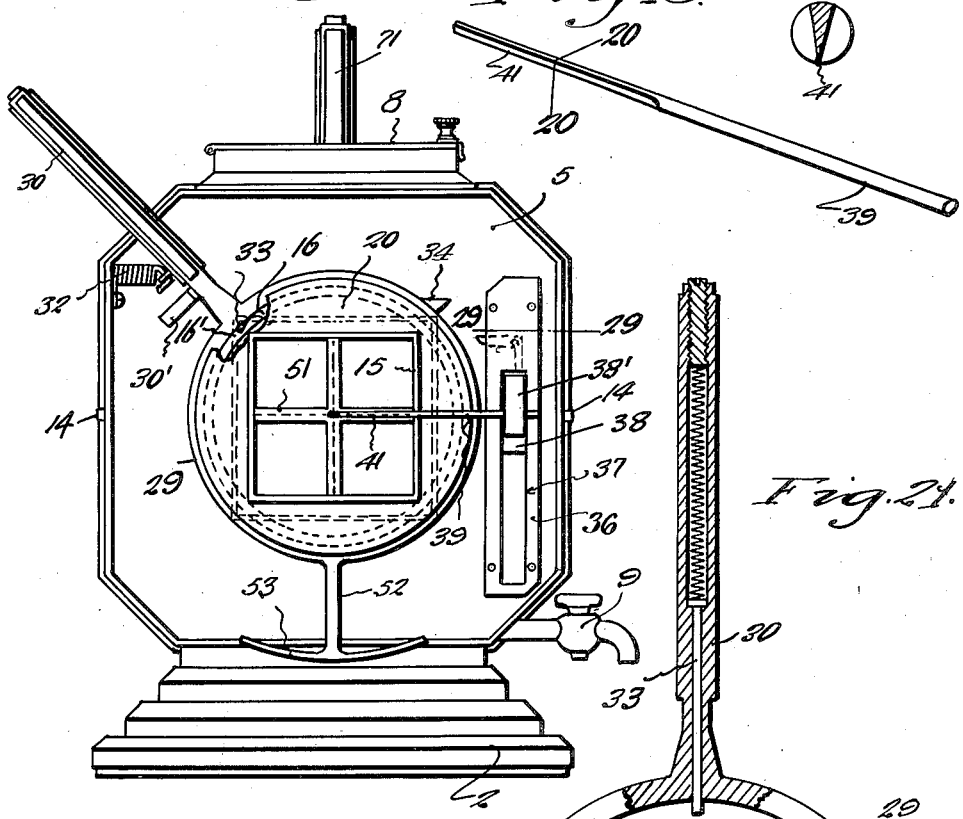

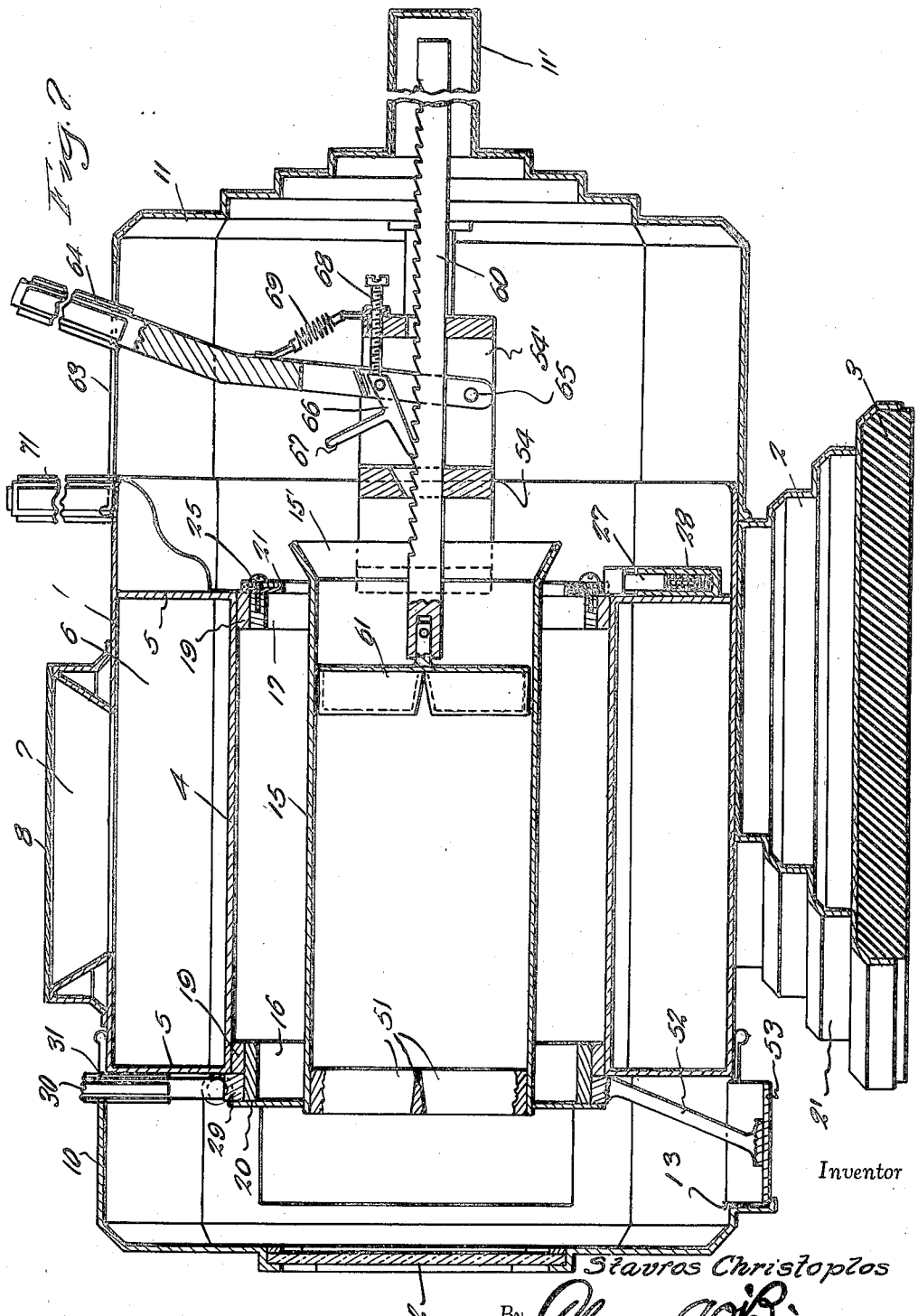

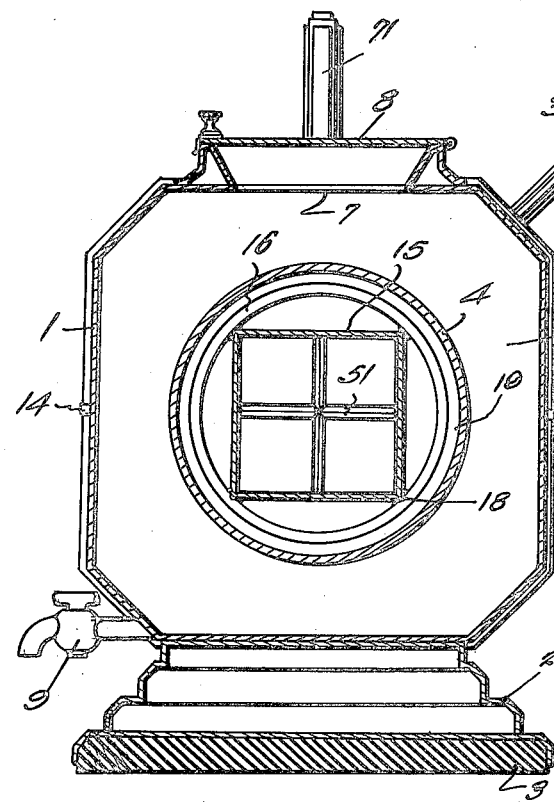
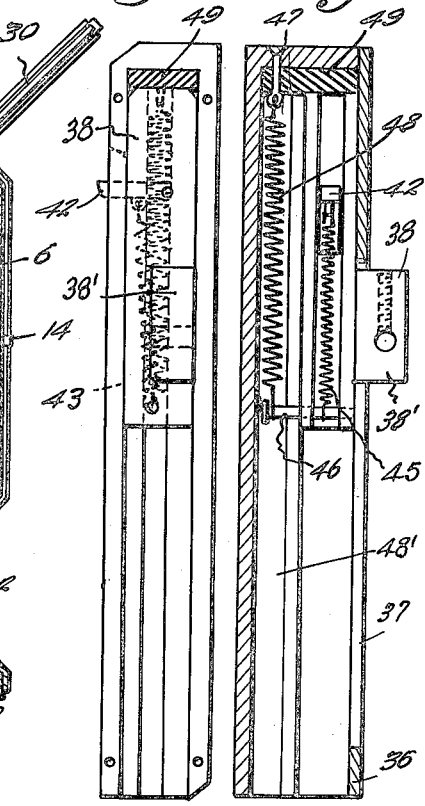
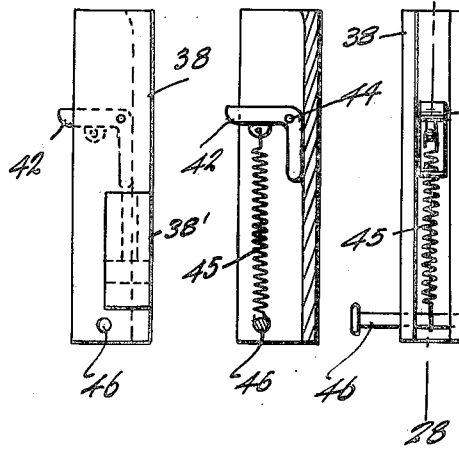
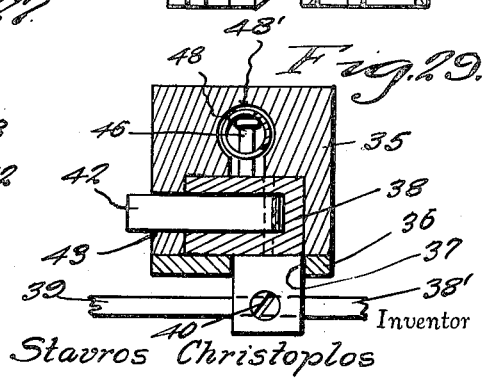

Patented Oct. 6, 1936

2,056,711

UNITED STATES PATENT OFFICE 2,056,711

REFRIGERATED BUTTER-CUTTING MACHINE

Stavros Christoplos, Milwaukee, Wis.

Application October 4, 1935, Serial No. 43,594

5 Claims. (Cl. 31—24)

This invention relates to a refrigerated butter cutting machine, the general object of the invention being to provide a casing adapted to receive ice or other refrigerating means and a chamber for receiving the butter, with means for forcing the butter from the chamber and cutting it into cubes and delivering the cubes at the front end of the casing.

Another object of the invention is to provide means whereby cubes can be cut of any desired thickness.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation of the device.

Figure 2 is a top plan view thereof.

Figure 3 is a view looking toward the front end of the device.

Figure 4 is a view looking toward the rear end thereof.

Figure 5 is a view looking into the rear end of the device with the rear cover removed and with the ram or plunger assembly removed.

Figure 6 is a view looking into the front end of the device with the front closure removed.

Figure 7 is an enlarged section on line 7—7 Figure 3.

Figure 8 is an enlarged section on line 8—8 of Figure 1.

Figure 9 is an enlarged section on line 9—9 of Figure 1.

Figure 10 is a transverse sectional view through the butter holder showing how the corners thereof are welded to a ring.

Figure 11 is a view of the knife assembly for cutting the blocks of butter into four quarters.

Figure 12 is a view of the front end of the ram or plunger.

Figure 13 is a section on line 13—13 of Figure 12.

Figure 14 is a perspective view of one of the bolts for holding the ram assembly and the rear cover in position.

Figure 15 is a view of the sectional ring having the ratchet teeth thereon.

Figure 16 is an edge view of said ring.

Figure 17 is a view of the front ratchet ring.

Figure 18 is an edge view of the device.

Figure 19 is a view of the knife bar.

Figure 20 is a section on line 20—20 of Figure 19.

Figure 21 is a sectional view through the handle of the operating ring with the ring in edge view and partly broken away.

Figure 22 is a front view of the ram supporting frame.

Figure 23 is a top plan view of said frame.

Figure 24 is a front view of the holder means for the bar knife.

Figure 25 is a longitudinal sectional view taken through Figure 24.

Figure 26 is a view of the sliding member in the holder.

Figure 27 is a view looking into the open side of the sliding member.

Figure 28 is a section on line 28—28 of Figure 27.

Figure 29 is an enlarged section on line 29—29 of Figure 6.

In these drawings, the numeral 1 indicates a horizontally arranged casing supported by the base 2 which has a pad 3 of rubber partly projecting from a recess at its bottom. A horizontally arranged cylinder 4 is located in the casing and has front and rear flanges 5 at its ends which are suitably connected to the interior walls of the casing so that this cylinder and its flanges form with the casing a chamber 6 for receiving ice which is inserted through an opening 7 in the top of the casing and which is covered by a door 8. If desired refrigerating coils may be located in the chamber 6 instead of using ice. A drain cock 9 is in communication with the lower part of the chamber 6 for draining the same when ice is used.

A front cover cap 10 has a sliding fit over the front end of the casing and a rear cover cap 11 has a sliding fit at the rear end thereof and the front cap 10 has a window 12 in its front and an outlet opening 13 in its bottom for the discharge of the cubes and the front part of the base 2 has a recess 2' therein for permitting a receptable to be placed under the opening 3 to receive the pieces of butter. Guide lugs 14 are formed on the ends of the casing at each side thereof for engaging notches in the caps 10 and 11 for insuring the caps being properly positioned.

A horizontally arranged butter holder 15 of rectangular shape in cross section is removably located within the cylinder 4 and a front ring 16 and a rear ring 17 are welded to the corners of the holder 15 adjacent the ends thereof as shown at 18 and these rings rotatably fit within the front and rear rings 19 welded or otherwise fastened into the ends of the cylinder 4. A flange 20 is connected to the front end of the holder to rest against the front ring 16 when the holder is in position. A two part ring 21 has the two parts thereof hingedly connected together as shown at 22 and said ring is formed with the holes 23, one of which passes through the overlapping hinged end, another passes through the opposed overlapping end while the others pass through intermediate portions of the ring as shown in Figure 15. The inner circumference of the ring is formed with the notches 24 for receiving the corners of the rear end of the holder 15 which flares outwardly as shown at 15' and screws 25 pass through the holes 23 into the ring 17 to fasten the ring 21 to the ring 17 and due to the notches 24 engaging the flaring end of the holder forward movement of the holder is prevented by the ring 21, the flange 20 preventing rearward movement of the holder. By making the ring 21 of two parts when it is detached from the ring 17 it can be opened so that it can pass the flaring end 15' of the holder and after it has been put in place and the screws 25 inserted the ring will firmly hold the holder against forward movement.

The outer circumference of the ring 21 is formed with the ratchet notches 26 for engagement by a spring pressed plunger 27 located in a housing 28 connected to the lower portion of the rear flange 5, this plunger acting to prevent turning movement of the holder 15 and the rings 16, 17 and 21 in one direction while permitting the parts to be turned in an opposite direction.

A ring 29 is rotatably arranged in the space formed by the rings 16 and 19 and the flange 20 and contact or surround the ring 16. The ring 16 is provided with ratchet notches 16' as shown more particularly in Figures 17 and 18, and a handle 30 is connected with the ring 29 and passes through a slot 31 formed in the front cap 10 and the front of the casing. This handle or lever 30 is normally held against a stop 30' in the front end of the casing by a spring 32 connected with the handle and with the right side of the casing. A spring-pressed pin 33 is located in the handle or lever 30 and extends through a hole in the ring 29 and is designed to engage the ratchets 16' in the ring 16 when the handle is moving back to its original position as shown in Figure 6 under the action of the spring 32 after the handle has been moved toward the right side of the casing. When the handle is moved toward the left side of the casing the pin is ratcheted over the teeth 16' without moving the ring 16 and the butter holder 15, and the butter holder is held against movement during this movement of the handle 30 by the plunger 27 engaging the ratchet teeth 26 of the ring 21. However, during the return movement of the handle by the spring 32 the butter holder 15 will be rotated due to the engagement of the pin 33 with the ratchet teeth 16' of the ring 16 and during this movement the plunger 27 will ratchet over the teeth 26 of the ring 21.

A cam projection 34 extends outwardly from the ring 29 and while the handle 30 is being moved from the right side of the casing toward the left side thereof this cam will come into engagement with a latch member of a knife carrier which is arranged in a vertically arranged casing 35 (see Figure 29) connected to the front of the casing and having its front covered by a plate 36 which is formed with a longitudinally extending slot 37. The knife carrier is shown at 38 and is of substantially channel shape in cross section and is slidably supported for vertical movement in the casing 35. And said carrier has a projection 38' which passes through the slot 37 and has a horizontal opening therein for receiving the knife bar 39 which is held in place by the screw 40. The free end portion of the bar is beveled as shown at 41 in Figures 19 and 20 to form a cutting edge. As shown in Figures 24 to 29 a latch member of bell crank shape is pivoted in the channel part of the carrier 38, as shown at 44, and this latch, indicated by the numeral 42, passes through a slot 43 in the inner side of the casing 35 and lies in the path of the cam projection 34. A spring 45 normally holds the vertical limb of the latch 42 against the bottom wall of the channel of the carrier 38, as shown in Figure 28 so that when the cam 34 strikes the projected end of the latch 42 the latch and the carrier 38 move downwardly and, of course, carry the knife bar 39 therewith so that the cutting edge of the knife will move from the position shown in Figure 6 downwardly to the bottom of the front end of the butter holder 15. As soon as the cam 34 passes the projecting end of the latch 42 a spring 48 connected with a pin 46 fastened to the carrier 38 and extending into a bore 48' of the casing 35 will raise the carrier, the knife and the latch 42 to the upper part of the casing 35. The upper end of the spring 48 is connected to an attaching member 47 as shown in Figure 25 and a member 49 of rubber or the like is placed in the upper end of the casing 35 and against which the carrier 38 strikes as it reaches the end of its upward movement. On the return movement of the spring 29 the cam 34 will strike the projecting end of the latch 42 but the latch will simply rock on its pivot 44 and against the action of the spring 45 so that the cam can readily pass the latch and then the spring 45 pull the latch to its normal position as shown in Figure 28.

A pair of knives 51, arranged at right angles to each other and intersecting each other as shown in Figure 11 is suitably fastened in the front end of the butter holder 15 with their beveled edges rearward so that these knives will divide the front end of the block of butter in the holder 15 into quarters.

A stem 52 depends from the ring 29 and carries an arcuate shaped door 53 for closing the opening 13 when the parts are in position shown in Figure 6. However, when the handle 30 is moved to cause the knife 39 to cut a slice from the quarter of butter over which it is placed in Figure 6 the door will open so that the slice of butter can drop through the opening 13 into the receptacle placed to receive it.

A frame 54 shown in detail in Figures 22 and 23 is located at the rear end of the casing 1 and is supported from the bolts 55, one of which is shown in Figure 14, and as it will be seen from this figure each bolt is provided with an angle head 56 which is fastened to the rear part 5 with the rounded part of the bolts passing through holes 57 in the ends of the frame 54 and through holes in the rear cap 11, where the projecting ends of the bolts receive the nuts 58. A spacer 59 is arranged on each bolt to act with the heads of the bolts to hold the frame in position, as shown more clearly in Figure 9. Of course these bolts and the nuts 58 hold the rear cap in position. The central part of the frame 54 is formed with a rectangular part 54' having holes in its forward and rear walls and a rack bar 60 passes through these holes and a ram 61 is connected to the front end of the rack bar, said ram having a pair of beveled grooves 62 therein which are arranged at right angles to each other and which intersect each other, these grooves being adapted to receive the knives 51 when the ram is in its forward position. The cap 11 is formed with a tubular reduced rear part 11' for receiving the rear end of the rack bar and with a slot 63 in its top part through which passes a hand lever 64 which is pivoted in the rectangular part 54' of the frame 54 as shown at 65. A pawl 66 is pivoted in a slotted part of the lower end of the hand lever 64 and has an upstanding handle 67 thereon and an adjusting screw 68 adjustably arranged in the rear wall of the part 54' engaging the upper part of the rear end of the pawl, the adjusting screw providing means for adjusting the pawl to regulate the movement of the rack bar 60 and the ram by the handle for regulating the thicknesses of the slices of butter cut by the knife 39. A spring 69 is connected to a part of the frame and to the handle and acts to hold it in its inoperative position and a second handle 71 rises from the rear end of the casing and serves as a hand hold for the hand engaging the handle 64 for steadying the machine while moving the handle 64 toward the handle 71.

If desired motors or the like can be used for operating the handles 30 and 64.

When the device is to be used the rear cap 11 is removed by unscrewing the nuts 58 from the bolts 55 and then by removing the spacers 59 the entire ram assembly including the frame 54 can be removed. Then a block of butter is placed in the holder 15, the flaring end 15' facilitating this and then the parts are replaced, after the ram is moved back to its rear limit by raising the dog 66 by the handle 67 and sliding the rack bar rearwardly. The handle 64 is then pressed forwardly so that the ram 61 will force the block of butter forwardly and when this is done the knives 51 will cut the forward end of the block into quarters. When a slice of butter is desired the handle 30 is moved to the opposite position from that shown in Figure 6, which causes the cam 34 to lower the knife carrier so that the knife 39 will slice the end off of the quarter of butter immediately below it, and as the door 53 has been moved in open position by this movement of the handle 30 and the ring 29 the slice of butter will drop through the opening 13 into the receptacle placed under the opening. As the handle 30 is returned to the position shown in Figure 6 it will rotate the ring 16 and therefore the holder 15 so that the next quarter part of the block of butter will be brought under the knife 39, the knife 39 having returned to the position shown in Figure 6 before the holder 15 and the parts were rotated. Then the handle 30 is moved again so that the knife 39 will cut another slice of butter off the next quarter part and this will continue until all the quarters have had a slice cut therefrom. Then the handle 64 is operated to move the ram forwardly another step which will project the quarters ready to be sliced by the knife 39. As before stated by adjusting the bolt 66 thicknesses of the slices cut from the quarters can be regulated.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A device of the class described comprising a casing, a butter holder rotatably supported in the casing, refrigerating means in the casing, means for pressing the butter in the holder forwardly step by step, knives for dividing the butter in sections, a blade for cutting slices off the sections and means when moving in one direction operating the blade to cut a slice off one section and when moved in an opposite direction partly rotating the butter holder to bring another section of butter in cutting position by the blade.

2. A device of the class described comprising a casing, a butter holder rotatably supported in the casing, refrigerating means in the casing, means for pressing the butter in the holder forwardly step by step, knives for dividing the butter in sections, a blade for cutting slices off the sections and means when moving in one direction operating the blade to cut a slice off one section and when moved in an opposite direction partly rotating the center holder to bring another section of butter in cutting position by the blade, and means for adjusting the amount of movement of the means for pushing the butter forwardly to regulate the thicknesses of the slices cut by the blade.

3. A device of the character described comprising a casing, a butter holder in the casing of rectangular shape in cross section, a ram, means for moving the same forwardly step by step for forcing the butter forwardly in the holder, a pair of intersecting knives at the front end of the holder for dividing the butter into quarters, a blade for cutting the quarters into slices, a handle, and means operated by movement of the handle in one direction to cause the blade to cut a slice from one quarter and for partly rotating the holder when the handle is moved in an opposite direction to bring another quarter to cutting position by the blade.

4. A device of the class described comprising a casing, a butter holder in the casing of rectangular shape in cross section, a ram in the holder, means for moving the same forwardly step by step to move the butter in the holder, means for adjusting the length of strokes of the ram, a pair of intersecting knives in the front end of the holder for dividing the butter into quarters, a ratchet member surrounding the front end of the holder, a handle, a ring carried thereby and surrounding the ratchet member, a spring-pressed pin in the handle for engaging the ratchet member when the handle is moved in one direction to cause rotary movement of the holder, ratchet means for preventing retrograde movement of the holder when the handle is moved in an opposite direction, a blade, and means for operating the blade when the handle is moved in the last-mentioned direction for slicing a piece of butter off one quarter, the movement of each of the ring and holder, by the opposite movement of the handle, bringing another quarter in the cutting position by the blade.

5. A device of the class described comprising a horizontal casing, front and rear caps detachably connected with the ends of the casing, a butter holder of rectangular shape in cross section arranged in the casing, refrigerating means in the casing, means for removably holding the holder in the casing and supporting it for rotary movement, a ram for pushing the butter forwardly in the holder, means including a rack bar, a pawl and handle for moving the ram forwardly step by step, means for adjusting the pawl, a pair of intersecting knives at the front end of the holder for dividing the block of butter into quarters, a ratchet ring surrounding the front end of the holder and connected therewith, a handle passing through a slot in the forward end of the casing, a ring connected with the inner end of the handle and surrounding the ratchet ring, a dog carried by the handle for engaging the ratchet ring for moving the ratchet ring and holder when the handle is moved in one direction, ratchet means at the rear end of the holder for preventing retrograde movement of the holder when the handle is being moved in an opposite direction, a blade, means for operating the same when the second mentioned handle is moved in said opposite direction for cutting a slice from a quarter, movement of the handle in the first direction turning the holder to bring another quarter to cutting position by the blade, the lower part of the front cap having a discharge opening for the slices cut by the blade, a door closing the opening and means connecting the door to the ring which is connected with the handle whereby the door is opened as a slice is being cut.

STAVROS CHRISTOPLOS.